US009667613B1

(12) United States Patent
Wisemon et al.

(10) Patent No.: US 9,667,613 B1
(45) Date of Patent: May 30, 2017

(54) DETECTING MOBILE DEVICE EMULATION

(71) Applicant: EMC Corporation, Hopkinton, MA (US)

(72) Inventors: Tamar Wisemon, Beit Shemesh (IL); Ika Bar-Menachem, Herzelia (IL); Maya Herskovic, Tel Aviv (IL); Theodor Mihalache, Tel Aviv (IL); Aviv Avital, Be'er Sheva (IL); Ayelet Avni, Binyamina (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/565,739

(22) Filed: Dec. 10, 2014

(51) Int. Cl.
  *G06F 9/455* (2006.01)
  *H04L 29/06* (2006.01)

(52) U.S. Cl.
  CPC .............. *H04L 63/08* (2013.01); *G06F 9/455* (2013.01)

(58) Field of Classification Search
  CPC ................................. H04L 63/08; G06F 9/455
  See application file for complete search history.

(56) References Cited

U.S. PATENT DOCUMENTS

| | | |
|---|---|---|
| 8,618,913 B1 | 12/2013 | Bailey et al. |
| 8,656,455 B1 | 2/2014 | Bailey et al. |
| 8,904,496 B1 | 12/2014 | Bailey et al. |
| 2004/0030912 A1* | 2/2004 | Merkle, Jr. ............. G06F 21/10 726/26 |
| 2008/0020733 A1* | 1/2008 | Wassingbo ............. G06F 3/017 455/411 |
| 2009/0249478 A1* | 10/2009 | Rosener ................. G06F 21/31 726/19 |
| 2011/0163955 A1* | 7/2011 | Nasiri ..................... A63F 13/06 345/158 |
| 2012/0150345 A1* | 6/2012 | Baltes .................. G05D 1/0274 700/245 |
| 2012/0297190 A1* | 11/2012 | Shen ..................... H04L 9/0866 713/168 |
| 2016/0180073 A1* | 6/2016 | Zhou ................... H04L 63/0876 726/27 |

FOREIGN PATENT DOCUMENTS

CN  WO 2014161259 A1 * 10/2014 ......... H04L 63/0876

\* cited by examiner

*Primary Examiner* — Carl Colin
*Assistant Examiner* — Vance Little
(74) *Attorney, Agent, or Firm* — BainwoodHuang

(57) ABSTRACT

A technique detects mobile device emulation. The technique involves identifying, by processing circuitry, a user apparatus for mobile device emulation detection. The technique further involves collecting, by the processing circuitry, motion sensor data from the identified user apparatus (e.g., samples of accelerometer attributes, gyroscopic attributes, gravity attributes, etc. over multiple time periods). The technique further involves performing, by the processing circuitry, a motion sensor data analysis operation based on the collected motion sensor data. A result of the motion sensor data analysis operation indicates whether the identified user apparatus is a physical mobile device or an emulated mobile device.

18 Claims, 5 Drawing Sheets

DETECTING MOBILE DEVICE EMULATION

BACKGROUND

A human may attempt to access a protected resource using a smart phone. Suitable protected resources include login access to an account on a remote server, access to remotely stored content, and virtual private network (VPN) access to name a few.

Prior to obtaining access to the protected resource, the human may be required to successfully authenticate with an authentication server. For example, the human may be required to supply a valid username and password to the authentication server. If the authentication server determines that the supplied username and password correctly match an expected username and password for the human, the authentication server allows the human to access the protected resource using the smart phone. However, if the authentication server determines that the supplied username and password does not match the expected username and password for the human, the authentication server denies access to the protected resource.

SUMMARY

Unfortunately, there are deficiencies to the above-described conventional authentication approach to obtaining access to a protected resource using a smart phone. For example, a non-authorized malicious person may attempt to gain access to the protected resource using a real smart phone. Alternatively, the non-authorized malicious person may attempt to gain access to the protected resource using an emulator which emulates a smart phone, i.e., a computer platform which developers routinely use to test and debug smart phone software. Such use of an emulator enables the non-authorized malicious person to emulate different smart phone devices without physically obtaining each smart phone device.

To address the possibility of a non-authorized malicious person gaining access to a protected resource using an emulator which emulates a smart phone, improved techniques are directed to detecting mobile device emulation based on an analysis of collected motion sensor data. In particular, motion sensor data is collected from a user apparatus that generally appears to be a mobile device. A motion sensor data analysis operation is then performed on the collected motion sensor data to determine whether user apparatus is a genuine (or physical) mobile device or an emulated mobile device. If the user apparatus is identified to be an emulated mobile device rather than a genuine mobile device, a set of remedial activities can be performed (e.g., denying access to a protected resource, adding the user apparatus to a black list, issuing an alarm or alert, continuing to communicate with the emulated mobile device to obtain more information, combinations thereof, etc.).

One embodiment is directed to a method of detecting mobile device emulation. The method includes identifying, by processing circuitry, a user apparatus for mobile device emulation detection. The method further includes collecting, by the processing circuitry, motion sensor data from the identified user apparatus (e.g., samples of accelerometer attributes, gyroscopic attributes, gravity attributes, etc.). The method further includes performing, by the processing circuitry, a motion sensor data analysis operation based on the collected motion sensor data. A result of the motion sensor data analysis operation indicates whether the identified user apparatus is a physical mobile device or an emulated mobile device.

In some arrangements, identifying the user apparatus for mobile device emulation detection includes receiving an authentication request indicating that a user of the user apparatus wishes to authenticate.

In some arrangements, collecting the motion sensor data includes (i) obtaining a first set of motion sensor readings from the user apparatus during a first reading collection time period, and (ii) obtaining a second set of motion sensor readings from the user apparatus during a second reading collection time period which is after the first reading collection time period.

In some arrangements, receipt of the authentication request initiates a user authentication session to authenticate the user. In these arrangements, both (i) obtaining the first set of motion sensor readings during the first reading collection time period and (ii) obtaining the second set of motion sensor readings during the second reading collection time period occur during the user authentication session to authenticate the user.

In some arrangements, performing the motion sensor data analysis operation includes performing a comparison operation which compares the first set of motion sensor readings to the second set of motion sensor readings to determine whether the first and second sets of motion sensor readings indicates movement of the user apparatus.

In some arrangements, performing the motion sensor data analysis operation further includes, after the comparison operation is performed, providing a motion sensor data analysis operation result indicating that that the user apparatus is an emulated mobile device in response to the comparison operation showing no movement of the user apparatus.

In some arrangements, the comparison operation indicates captured orientation movement of the user apparatus from a first (e.g., previous) user apparatus orientation to a second (e.g., current) user apparatus orientation. In these arrangements, performing the motion sensor data analysis operation further includes comparing the captured orientation movement to a normal orientation movement profile to determine whether the first and second sets of motion sensor readings are actual motion sensor attributes from a physical mobile device.

In some arrangements, the comparison operation indicates captured location movement of the user apparatus from a first user apparatus location to a second user apparatus location. In these arrangements, performing the motion sensor data analysis operation further includes comparing the captured location movement to a normal location movement profile to determine whether the first and second sets of motion sensor readings are actual motion sensor attributes from a physical mobile device.

In some arrangements, obtaining the first set of motion sensor readings from the user apparatus includes acquiring first accelerometer data which signifies acceleration force applied to the user apparatus during the first reading collection time period. Here, obtaining the second set of motion sensor readings from the user apparatus includes acquiring second accelerometer data which signifies acceleration force applied to the user apparatus during the second reading collection time period.

In some arrangements, obtaining the first set of motion sensor readings from the user apparatus includes acquiring first gyroscopic data which signifies a set of rates of rotation of the user apparatus around a set of physical axes during the first reading collection time period. Here, obtaining the second set of motion sensor readings from the user apparatus includes acquiring second gyroscopic data which signifies a set of rates of rotation of the user apparatus around the set of physical axes during the second reading collection time period.

In some arrangements, obtaining the first set of motion sensor readings from the user apparatus includes acquiring first gravity data which signifies the force of gravity applied to the user apparatus during the first reading collection time period. Here, obtaining the second set of motion sensor readings from the user apparatus includes acquiring second gravity data which signifies the force of gravity applied to the user apparatus during the second reading collection time period.

In some arrangements, obtaining the first set of motion sensor readings from the user apparatus includes acquiring: (i) first accelerometer data which signifies acceleration force applied to the user apparatus during the first reading collection time period, (ii) first gyroscopic data which signifies a set of rates of rotation around a set of physical axes for the user apparatus during the first reading collection time period, and (iii) first gravity data which signifies gravitational force applied to the user apparatus during the first reading collection time period. In these arrangements, obtaining the second set of motion sensor readings from the user apparatus includes acquiring: (i) second accelerometer data which signifies acceleration force applied to the user apparatus during the second reading collection time period, (ii) second gyroscopic data which signifies a set of rates of rotation around a set of physical axes for the user apparatus during the second reading collection time period, and (iii) second gravity data which signifies gravitational force applied to the user apparatus during the second reading collection time period.

Another embodiment is directed to an electronic apparatus which includes a network interface, memory, and control circuitry coupled to the network interface and the memory. The memory stores instructions which, when carried out by the control circuitry, cause the control circuitry to:
(A) identify a user apparatus for mobile device emulation detection,
(B) collecting motion sensor data from the identified user apparatus through the network interface, and
(C) perform a motion sensor data analysis operation based on the collected motion sensor data, a result of the motion sensor data analysis operation indicating whether the identified user apparatus is a physical mobile device or an emulated mobile device.

Yet another embodiment is directed to a computer program product having a non-transitory computer readable medium which stores a set of instructions to detect mobile device emulation. The set of instructions, when carried out by computerized circuitry, causes the computerized circuitry to perform a method of:
(A) identifying a user apparatus for mobile device emulation detection;
(B) collecting motion sensor data from the identified user apparatus; and
(C) performing a motion sensor data analysis operation based on the collected motion sensor data, a result of the motion sensor data analysis operation indicating whether the identified user apparatus is a physical mobile device or an emulated mobile device.

It should be understood that, in the cloud context, the electronic circuitry disclosed herein is formed by remote computer resources distributed over a network. Such electronic circuitry is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in detecting mobile device emulation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to detecting mobile device emulation based on an analysis of collected motion sensor data (e.g., samples of accelerometer attributes, gyroscopic attributes, gravity attributes, etc. acquired during an authentication session). In particular, motion sensor data is collected from a user apparatus that generally appears to be a mobile device (e.g., a smart phone, a tablet, etc.). Motion sensor data analysis is then performed on the collected motion sensor data to determine whether user apparatus is a genuine (or physical) mobile device or an emulated mobile device. If the user apparatus is identified to be an emulated mobile device rather than a genuine mobile device, a set of remedial activities can be performed (e.g., denying access to a protected resource, adding the user apparatus to a black list, issuing an alarm or alert, continuing to communicate with the emulated mobile device to obtain more information, combinations thereof, etc.).

Figure 1:
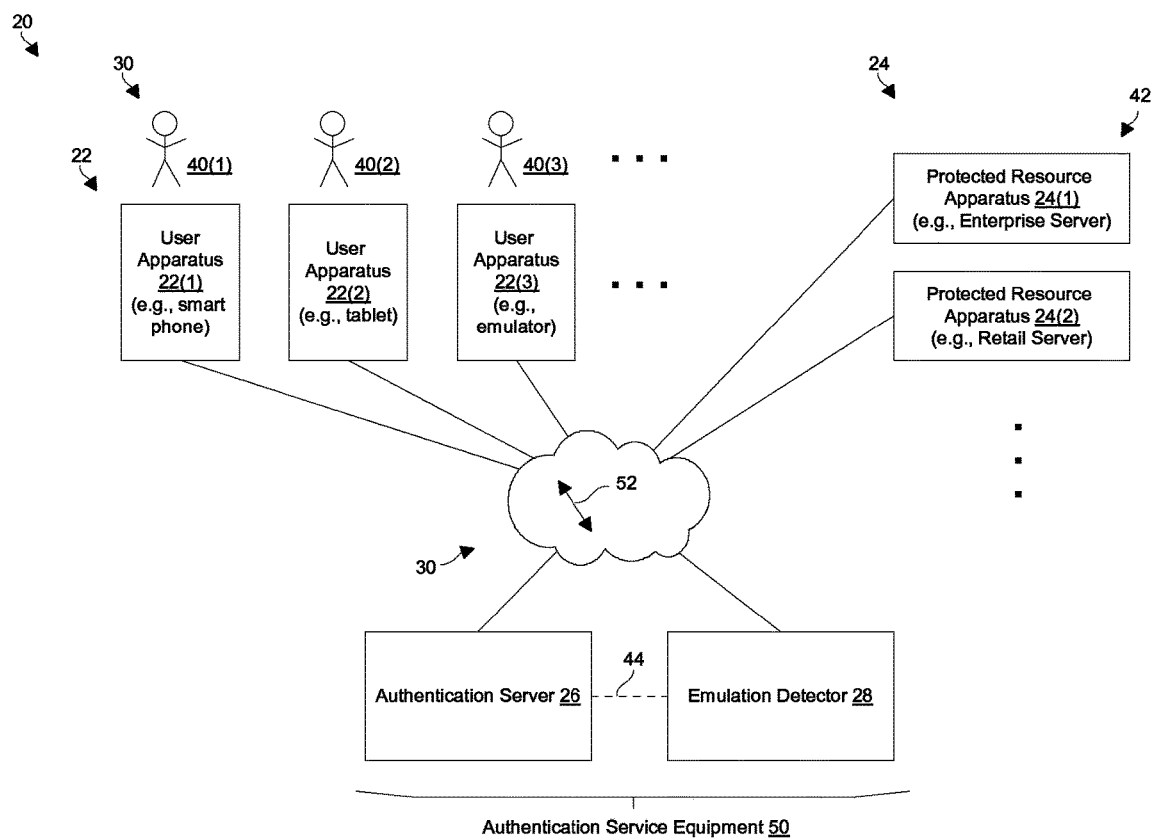
FIG. 1 is a block diagram of an electronic environment which is suitable for detecting mobile device emulation.

FIG. 1 shows an electronic environment 20 which is suitable for detecting mobile device emulation. The electronic environment 20 includes user apparatus 22(1), 22(2), 22(3), . . . (collectively, user apparatus 22), protected resource apparatus 24(1), 24(2), . . . (collectively, protected resource apparatus 24), an authentication server 26, an emulation detector 28, and communications medium 30.

Each user apparatus 22 is operated by a respective user 40 and enables that user 40 to perform useful work. For example, the user apparatus 22(1) may be a smart phone and operated by a user 40(1). Similarly, the user apparatus 22(2) may be a tablet or other type of mobile device and operated by a user 40(2). Furthermore, the user apparatus 22(3) may be an emulator apparatus, which emulates a mobile device and which is operated by a user 40(3), and so on.

Each protected resource apparatus 24 is constructed and arranged to provide users 40 with access to one or more remote protected resources 42 upon successful authentication of the users 40 by the authentication server 26. For example, the protected resource apparatus 24(1) may be a physical enterprise server which provides members of an enterprise with certain enterprise services such as virtual private network (VPN) access, email access, enterprise database access, access to engineering designs, access to sales department data, and so on. As a second example, the protected resource apparatus 24(2) may be a retail server which provides certain retail services such as the ability to make online purchases, online bill payment, online banking, and so on. It should be understood that some remote protected resources 42 may be distributed in nature or involve circuitry at more than one location (e.g., cloud resources, device clusters, server farms, etc.).

The authentication server 26 is constructed and arranged to authenticate the users 40 operating the user apparatus 22 and, if authentication is successful, grant access to the protected resources 42 provided by the protected resource apparatus 24. However, if authentication is unsuccessful, the authentication server 26 denies access to the protected resources 42 provided by the protected resource apparatus 24.

In particular, the authentication server 26 receives authentication factors and, based on the authentication factors, determines whether the users 40 are genuine or fraudsters. If the authentication server 26 determines that a user 40 is genuine, i.e., a human who is legitimately entitled to access a requested protected resource 42, the authentication server 26 outputs a control signal which allows access (e.g., a signal to a protected resource apparatus 24 with instructions to permit access). However, if the authentication server 26 cannot conclude that a user 40 is genuine, i.e., a human who may be an imposter and not entitled to access the protected resource 42, the authentication server 26 outputs a control signal denying access. It should be understood that a variety of authentication techniques are suitable for use such as standard authentication, multifactor authentication, biometric authentication, adaptive or risk-based authentication, knowledge-based authentication, step-up authentication, combinations thereof, and so on.

The emulation detector 28 is constructed and arranged to determine whether a user apparatus 22 is a genuine mobile device or an emulated mobile device based on motion sensor attributes obtained from the user apparatus 22. If the user apparatus 22 is determined to be an emulated mobile device, the emulation detector 28 performs a set of remedial actions such as notifying the authentication server 26 to enable the authentication server 26 to deny access to the user 40 of that user apparatus 22, outputting an alert to an administrator, adding the user apparatus 22 to a black list, continuing to communicate with the user apparatus 22 to obtain more information, and so on.

In some arrangements, the determinations as to whether the user apparatus 22 is a physical mobile device or an emulated mobile device are input to the authentication server 26 to enable the authentication server 26 to make authentication decisions based on the determinations. Along these lines, the dashed line 44 in FIG. 1 represents information exchange between the authentication server 26 and the emulation detector 28. In such arrangements, the authentication server 26 and the emulation detector 28 are integrated to form authentication service equipment 50. Such equipment 50 may take the form of a server apparatus, a server farm, circuitry distributed over multiple locations, and so on. In a particular arrangement, the authentication server 26 and the emulation detector 28 share the same processing circuitry, processors and/or microprocessor chipsets.

The communications medium 30 is constructed and arranged to connect the various components of the electronic environment 20 together to enable these components to exchange electronic signals 52 (e.g., see the double arrow 52). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 40 operate their respective client apparatus 22 to perform useful work. To access the protected resources 42 provided by the protected resource servers 24, the users 40 authenticate with the authentication server 26. If authentication is successful, the authentication server 26 grants the users 40 access to the protected resources 42 (e.g., by sending an authorization signal to the appropriate protected resource apparatus 24, to the appropriate user apparatus 22, or both). However, if authentication is unsuccessful, the authentication server 26 denies the users 40 access to the protected resources 42 (e.g., by sending a denial signal to the appropriate protected resource apparatus 24, to the appropriate user apparatus 22, or both).

In some use cases, the authentication server 26 involves the emulation detector 28 during user authentication. In these situations, the authentication server 26 conveys motion sensor attributes obtained from the user apparatus 22 to the emulation detector 28 which evaluates the motion sensor attributes to determine whether the user apparatus 22 are emulated mobile devices 22. If so, the emulation detector 28 notifies the authentication server 26 which can then take remedial action. Such remedial action may be based on policy (e.g., allow the user 40 to retry authentication a predefined number of times, lockout the user 40 following a predefined number of failed authentication attempts, sound an alarm/alert, other remedial actions, etc.).

It should be understood that other use cases exist as well. For example, in some situations, the motion sensor attributes are initially collected, and then forensically analyzed afterward. Such an arrangement enables the results of the analysis to be used for a variety of purposes such as machine learning (e.g., teaching a risk engine of the authentication server 26), distributing the analysis results to subscribers of an eFraud network (e.g., to different organizations that share security information to improve overall security), and so on. Further details will now be provided with reference to FIG. 2.

Figure 2:
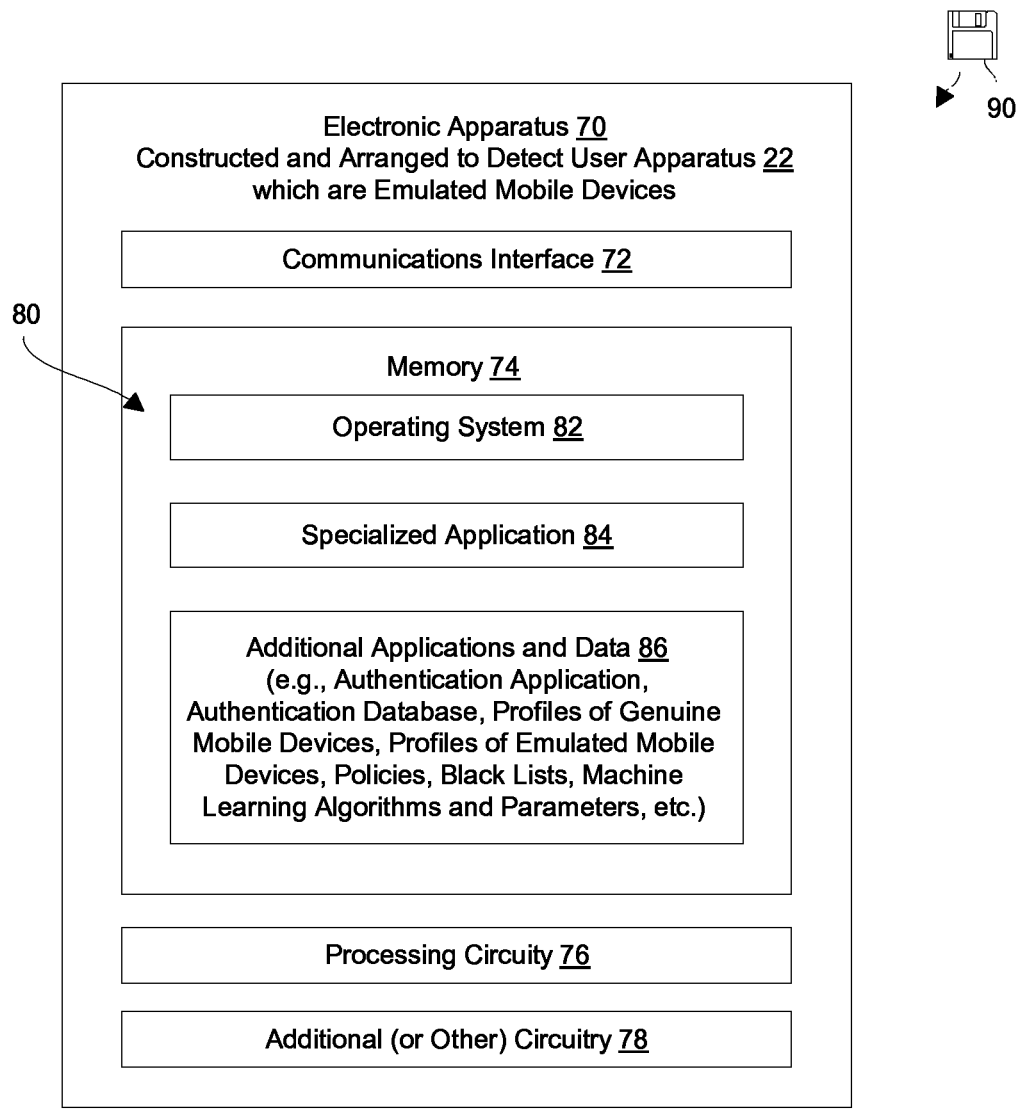
FIG. 2 is a block diagram of an electronic apparatus which is suitable for an emulation detector of FIG. 1.

FIG. 2 shows particular details of an electronic apparatus 70 which is constructed and arranged to operate as the emulation detector 28 of FIG. 1. The electronic apparatus 70 includes a communications interface 72, memory 74, processing circuitry 76, and additional (or other) circuitry 78.

The communications interface 72 is constructed and arranged to connect the electronic apparatus 70 to the communications medium 30 to enable communications with other components of the electronic environment 20 (FIG. 1). Such communications may be IP-based, cellular-based, cable-based, combinations thereof, and so on.

The memory 74 is intended to represent both volatile storage (e.g., DRAM, SRAM, etc.) and non-volatile storage (e.g., flash memory, etc.). The memory 74 stores a variety of software constructs 80 including an operating system 82 to manage resources of the electronic apparatus 70, a specialized application 84 to detect mobile device emulation, and additional applications and data 86 (e.g., additional utilities, tools, databases, etc.). As will be explained in further detail below, the additional applications and data 86 may include an authentication application to enable the electronic apparatus 70 further operate as the authentication server 26.

The processing circuitry 76 is constructed and arranged to operate in accordance with the various software constructs 80 stored in the memory 74. Such circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic apparatus 70. The computer program product 90 has a non-transitory (or non-volatile) computer readable medium which stores a set of instructions which controls one or more operations of the electronic apparatus 70. Examples of suitable computer readable storage media include tangible articles of manufacture and apparatus which store instructions in a non-volatile manner such as CD-ROM, flash memory, disk memory, tape memory, and the like.

The additional circuitry 78 represents other portions of the electronic apparatus 70. Along these lines, the electronic apparatus 70 may include a user interface to enable a special user such as a human administrator to enter input and receive output (user I/O) to operate the electronic apparatus 70 such as to respond to alarms/alerts, for teaching purposes, to configure the system, and so on.

During operation, the processing circuitry 76 runs the specialized application 84 to form specialized control circuitry of the emulation detector 28 (FIG. 1) which performs emulated mobile device detection. That is, when the processing circuitry 76 runs the specialized application 84, the specialized control circuitry examines motion sensor data from the user apparatus 22 to determine whether the user apparatus 22 are genuine mobile devices (e.g., see user apparatus 22(1), 22(2) in FIG. 1) or emulated mobile devices (e.g., see user apparatus 22(3) in FIG. 1).

In some arrangements, such detection is based on whether the motion sensor data indicates any mobile device movement. That is, if the motion sensor data from a particular user apparatus 22 does not indicate any mobile device movement (or if the particular user apparatus 22 indicates that it is a mobile device but is unable to provide any motion sensor data), the emulation detector 28 concludes that the particular user apparatus 22 is not a physical mobile device. Rather, the particular user apparatus 22 is likely an emulate mobile device which increases the risk that the user 40 of the particular user apparatus 22 is attempting malicious activity.

In other arrangements, such emulated mobile device detection is based on whether movement detected by the emulation detector 28 closely matches a set of predefined profiles. Such profiles may be associated with normal behavior of genuine mobile devices, or behavior of emulated mobile devices. The emulation detector 28 can perform such analysis using machine learning techniques to improve accuracy over time.

Additionally, it should be understood that in some arrangements the electronic apparatus 70 further operates as the authentication server 26. In these arrangements, the authentication server 26 collects a set of artifacts from the user apparatus 22 of the user 40 who is attempting to successfully authenticate. If the user apparatus 22 is supposed to be a mobile device, the authentication server 26 then extracts motion sensor data from the set of artifacts, and passes the motion sensor data to the emulation detector 28 to determine whether the user apparatus 22 is a genuinely a mobile device or is an emulated mobile device. The emulation detector then analyzes the motion sensor data and sends a notification to the authentication server 26 indicating whether the user apparatus 22 is a genuine mobile device or an emulated mobile device. This notification is used as an input to the authentication server 26 (i.e., another authentication factor).

In some arrangements, the emulation detector notification is an input to risk-based authentication which results in a risk score (i.e., a numerical measure of riskiness that the user 40 is an imposter) which is then compared to a risk score threshold to determine whether authentication is successful. Here, the emulation detector notification can be binary input (e.g., genuine vs. emulated) or a numerical weight (e.g., a probability that the mobile device is genuine or emulated). If the ultimate risk score generated by the authentication server 26 is lower than the risk score threshold, authentication is considered successful and the authentication server 26 grants access. However, if the ultimate risk score is higher than the risk score threshold, authentication is considered unsuccessful and the authentication server 26 denies access. Further details will now be provided with reference to FIG. 3.

Figure 3:
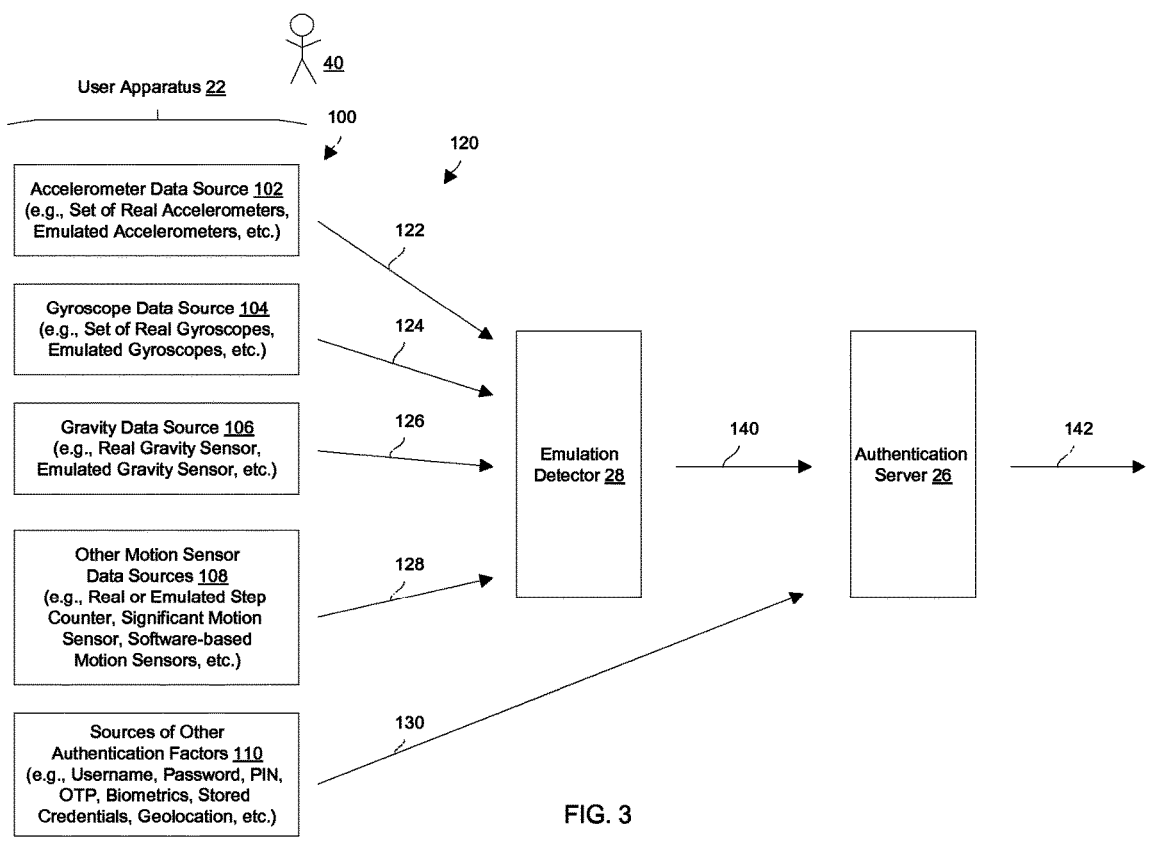
FIG. 3 is a block diagram illustrating an exchange between a user apparatus and the emulation detector of FIG. 1.

FIG. 3 shows a flow of data that occurs to determine whether a user apparatus 22 is genuine or emulated, and then to authenticate a user 40 operating the user apparatus 22 based on such determination. Such a flow of data may occur during an authentication session in which the user 40 requests authentication in order to obtain access to a protected resource 42 (also see FIG. 1).

Regardless of whether the user apparatus 22 is a genuine mobile device or an emulated mobile device, the user apparatus 22 may include information sources 100 such as an accelerometer data source 102, a gyroscopic data source 104, a gravity data source 106, other motion sensor data sources 108, and sources of other authentication factors 110. These information sources 100 provide user apparatus data (i.e., artifacts) which can be analyzed by the emulation detector 28 and the authentication server 26 (also see FIG. 1).

For example, the information sources 100 provide motion sensor information for analysis by the emulation detector 28. It should be understood that, in a real mobile device, the information sources 100 that provide motion sensor information are typically readily available to provide readings. That is, these information sources 100 do not require privileges and are intended to facilitate operation of a genuine mobile device. Accordingly, fraudsters may be unaware that data from these information sources 100 is being collected.

Along these lines, the accelerometer data source 102 provides accelerometer data 122 which signifies acceleration force currently applied to the user apparatus 22 (e.g., acceleration values around three different axes). Additionally, the gyroscope data source 104 provides gyroscope data 124 which signifies a current set of rates of rotation of the user apparatus 22 around a set of physical axes (e.g., the X-axis, the Y-axis, and the Z-axis). Furthermore, the gravity data source 106 provides gravity data 124 which signifies the current force of gravity applied to the user apparatus 22. Also, the other motion sensor data sources 108 provide other motion sensor data 128 which signifies other current motions of the user apparatus 22, e.g., step counter data, significant motion, software-based motions, etc.

As mentioned earlier, the emulation detector 28 performs a motion sensor data analysis operation based on the collected motion sensor information. An emulation detector result 140 of this operation indicates whether the emulation detector 28 considers the user apparatus 22 to be a genuine mobile device or an emulated mobile device.

For example, if there is no data from one or more of the information sources, it may be a signal that a fraudster has failed to provide mock motion sensor data for that motion sensor data source. Accordingly, the emulation detector 28 may interpret missing data for motion sensor source as an indication that the user apparatus 22 is emulating a mobile device (e.g., see the user apparatus 22(3) in FIG. 1).

Additionally, the emulation detector 28 can collect multiple motion sensor data samples (i.e., readings/attributes/ etc. from the various motion sensor data sources) over time (e.g., over the course of 1-2 minutes). The emulation detector can then compare these samples from time collection to another, and then another, etc. If the motion sensor data from the user apparatus 22 indicates that there is no movement of the user apparatus 22 even though normally there is movement of a genuine mobile device during user operation, the emulation detector 28 may interpret the lack of movement as an indication that the user apparatus 22 is emulating a mobile device.

In some arrangements, collection and analysis of the motion sensor data samples occurs continuously (e.g., an evaluation of several samples). In these arrangements, the emulation detector 28 is capable of performing multiple comparisons between the samples. Additionally, from the samples, the emulation detector 28 can identify particular types of movement and then assess whether such movement appears to be normal user behavior or whether such movement is not genuine.

It should be understood that the sources of other authentication factors 110 provide other authentication factors 130 for analysis by the authentication server 26. Such authentication factors 110 can include a username of the user 40, a password of the user 40, a one-time passcode (OTP), one or more biometrics (e.g., a fingerprint scan, a voice scan, a facial scan, etc.), credentials stored within the user apparatus 22, geolocation, and so on.

The authentication server 26 performs an authentication operation based on the result signal 140 from the emulation detector 28 (e.g., see the dashed line 44 in FIG. 1) and the other authentication factors 130 to determine whether the user 40 of the user apparatus 22 is the legitimate user or an imposter. In particular, the authentication server 26 outputs an authentication result 142 indicating whether authentication is successful or unsuccessful. If the authentication result 142 indicates that authentication is successful, the user 40 is granted access to a protected resource 42. However, if the authentication result 142 indicates that authentication is successful, the user 40 is denied access to the protected resource 42. Further details will now be provided with reference to FIG. 4.

Figure 4:
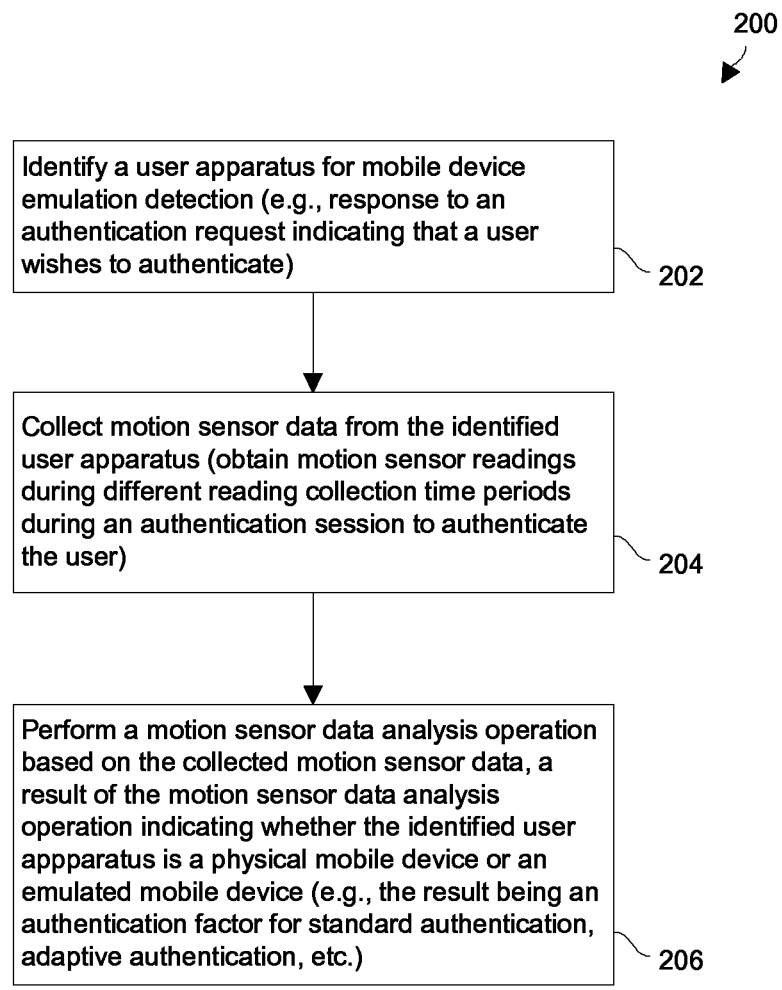
FIG. 4 is a flowchart of a procedure which is performed by the emulation detector when detecting mobile device emulation.

FIG. 4 is a flowchart of a procedure 200 which is performed by the electronic apparatus 70 (FIG. 2) when performing mobile device emulation detection. At 202, the electronic apparatus 70 identifies a user apparatus 22 for mobile device emulation detection. Along these lines, the electronic apparatus 70 may identify the user apparatus 22 in response to an authentication request indicating that a user 40 wishes to authentication. Other activities may trigger the electronic apparatus 70 to identify the user apparatus 22 as well such as establishing a connection with the user apparatus 22, when the user apparatus 22 attempts to access a service, and so on.

At 204, the electronic apparatus 70 collects motion sensor data from the identified user apparatus 22. Here, the electronic apparatus 70 takes readings from one or more motion sensor data sources. As mentioned above, such source may provide accelerometer data, gyroscopic data, gravity data, and so on. Additionally, such collection may span a period of time, e.g., collecting new samples every 30 seconds, every minute, etc. (e.g., during an authentication session while the user 40 is performing certain activities such as also providing a biometric scan, entering a password, answering a question, hitting a submit button, and so on).

At 206, the electronic apparatus 70 performs a motion sensor data analysis operation based on the collected motion sensor data, a result of the motion sensor data analysis operation indicating whether the identified user apparatus is a physical mobile device or an emulated mobile device. The result can then be used as an authentication factor (e.g., see the dashed line 44 in FIG. 1) to multifactor authentication of the user 40, to risk-based authentication of the user 40, to sound an alarm, and so on. Further details will now be provided with reference to FIG. 5.

Figure 5:
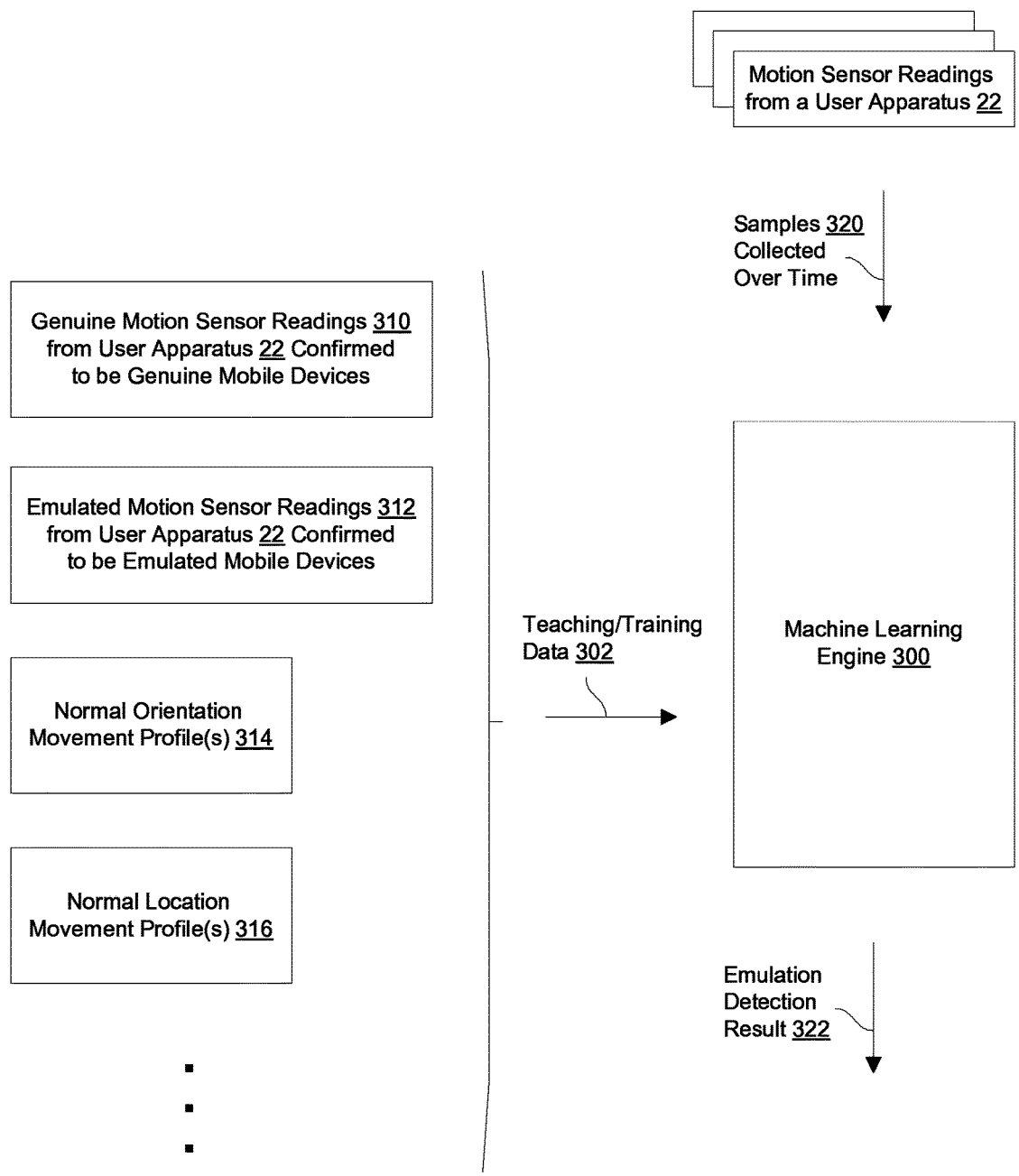
FIG. 5 is a block diagram of an enhanced emulation detection process which involves machine learning to discern between motion sensor data of a genuine user and faux sensor data from an emulated mobile device.

FIG. 5 is shows an enhanced emulation detection process which involves machine learning to discern between motion sensor data of a genuine mobile device and faux sensor data from an emulated mobile device. In particular, the emulation detector 28 includes a machine learning engine 300 which periodically receives teaching or training data 302 to distinguish between motion sensor data from a genuine user and motion sensor data from an emulator. The machine learning engine 300 can be formed by the processing circuitry 76 running the specialized application 84 (also see FIG. 2).

As shown in FIG. 5, the training data 302 can include genuine motion sensor readings 310 from user apparatus 22 which have been confirmed to be genuine mobile devices, emulated motion sensor readings 312 from user apparatus 22 which have been confirmed to be emulated mobile devices, normal orientation movement profiles (e.g., gyroscopic data) describing normal user behavior, and normal location movement profiles (e.g., accelerometer and gravity sensor data) describing normal user behavior, among other things (also see the additional applications and data 86 in FIG. 2). Such training data 302 is input to the machine learning engine 300 routinely/periodically to keep the machine learning engine 300 up to date (e.g., daily, weekly, bi-weekly, etc.).

As a result, the machine learning engine 300 is well-equipped to receive samples 320 of motion sensor readings from a user apparatus 22, and identify whether the user apparatus 22 is an emulator. In particular, the machine learning engine 300 outputs an emulation detection result 322 indicating whether the user apparatus 22 is a genuine mobile device or an emulated mobile device.

As described above, improved techniques are directed to detecting mobile device emulation based on an analysis of collected motion sensor data. In particular, motion sensor data is collected from a user apparatus 22 that generally appears to be a mobile device. A motion sensor data analysis operation is then performed on the collected motion sensor data to determine whether user apparatus 22 is a genuine (or physical) mobile device or an emulated mobile device. If the user apparatus 22 is identified to be an emulated mobile device rather than a genuine mobile device, a set of remedial activities can be performed (e.g., denying access to a protected resource, adding the user apparatus to a black list, issuing an alarm or alert, continuing to communicate with the emulated mobile device to obtain more information, combinations thereof, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that, in the mobile world, fraudsters can attack systems through mobile devices (which in many cases are considered more secure than a regular personal computer). Since it is not practical to buy many mobile devices for this kind of attack, the solution from the fraudster's perspective is to use an emulator in order to emulate different mobile devices. However, with the improvements disclosed herein, motion sensor data from the user apparatus 22 can be collected and analyzed to detect emulators. Along these lines, a device's unique attributes such as gyroscope, accelerometer and gravity sensor readings can be acquired in order to detect if an emulator is in use. This data can be used "as is" since some of the attributes can't be replicated by standard emulators. Moreover, the data can be integrated in to a machine learning system which can detect and identify if the motion resembles a genuine user. In this way, more sophisticated emulators in which fraudsters attempt to mock additional sensors can be detected. Such modifications and enhancements are intended to belong to various embodiments of the disclosure.

What is claimed is:

1. A method of detecting mobile device emulation, the method comprising:
    identifying, by processing circuitry, a user apparatus for mobile device emulation detection;
    collecting, by the processing circuitry, motion sensor data from the identified user apparatus;
    performing, by the processing circuitry, a motion sensor data analysis operation based on the collected motion sensor data, a result of the motion sensor data analysis operation indicating whether the identified user apparatus is a physical mobile device or an emulated mobile device;
    upon performance of the motion sensor data analysis operation and in response to the motion sensor data indicating no mobile device movement, providing an electronic emulation detection result indicating whether a user operating the user apparatus (i) is operating a genuine physical mobile device or (ii) is emulating the genuine physical mobile device using a device which is different from the genuine physical mobile device; and
    in response to the electronic emulation detection result indicating that the user is emulating the genuine physical mobile device using the device which is different from the genuine physical mobile device, outputting an alert electronically indicating that the user apparatus is an emulated mobile device rather than a physical mobile device;
    wherein the collected motion sensor data includes a first set of motion sensor readings and a second set of motion sensor readings;
    wherein the first set of motion sensor readings includes at least one of: (i) first accelerometer data which signifies acceleration force applied to the user apparatus during the first reading collection time period, (ii) first gyroscopic data which signifies a set of rates of rotation around a set of physical axes for the user apparatus during the first reading collection time period, and (iii) first gravity data which signifies gravitational force applied to the user apparatus during the first reading collection time period; and
    wherein the second set of motion sensor readings includes at least one of: (i) second accelerometer data which signifies acceleration force applied to the user apparatus during the second reading collection time period, (ii) second gyroscopic data which signifies a set of rates of rotation around a set of physical axes for the user apparatus during the second reading collection time period, and (iii) second gravity data which signifies gravitational force applied to the user apparatus during the second reading collection time period.

2. A method as in claim 1 wherein identifying the user apparatus for mobile device emulation detection includes:
    receiving an authentication request indicating that the user operating the user apparatus wishes to authenticate.

3. A method as in claim 2 wherein collecting the motion sensor data includes:
    obtaining the first set of motion sensor readings from the user apparatus during a first reading collection time period, and
    obtaining the second set of motion sensor readings from the user apparatus during a second reading collection time period which is after the first reading collection time period.

4. A method as in claim 3 wherein receipt of the authentication request initiates a user authentication session to authenticate the user; and
    wherein (i) obtaining the first set of motion sensor readings during the first reading collection time period and (ii) obtaining the second set of motion sensor readings during the second reading collection time period occur during the user authentication session to authenticate the user.

5. A method as in claim 3 wherein performing the motion sensor data analysis operation includes:
    performing a comparison operation which compares the first set of motion sensor readings to the second set of motion sensor readings to determine whether the first and second sets of motion sensor readings indicates movement of the user apparatus.

6. A method as in claim 5 wherein the comparison operation indicates captured orientation movement of the user apparatus from a first user apparatus orientation to a second user apparatus orientation; and wherein performing the motion sensor data analysis operation further includes:
  comparing the captured orientation movement to a normal orientation movement profile to determine whether the first and second sets of motion sensor readings are actual motion sensor attributes from a physical mobile device.

7. A method as in claim 5 wherein the comparison operation indicates captured location movement of the user apparatus from a first user apparatus location to a second user apparatus location; and wherein performing the motion sensor data analysis operation further includes:
  comparing the captured location movement to a normal location movement profile to determine whether the first and second sets of motion sensor readings are actual motion sensor attributes from a physical mobile device.

8. A method as in claim 3 wherein obtaining the first set of motion sensor readings from the user apparatus includes acquiring first accelerometer data which signifies acceleration force applied to the user apparatus during the first reading collection time period; and
  wherein obtaining the second set of motion sensor readings from the user apparatus includes acquiring second accelerometer data which signifies acceleration force applied to the user apparatus during the second reading collection time period.

9. A method as in claim 3 wherein obtaining the first set of motion sensor readings from the user apparatus includes acquiring first gyroscopic data which signifies a set of rates of rotation of the user apparatus around a set of physical axes during the first reading collection time period; and
  wherein obtaining the second set of motion sensor readings from the user apparatus includes acquiring second gyroscopic data which signifies a set of rates of rotation of the user apparatus around the set of physical axes during the second reading collection time period.

10. A method as in claim 3 wherein obtaining the first set of motion sensor readings from the user apparatus includes acquiring first gravity data which signifies the force of gravity applied to the user apparatus during the first reading collection time period; and
  wherein obtaining the second set of motion sensor readings from the user apparatus includes acquiring second gravity data which signifies the force of gravity applied to the user apparatus during the second reading collection time period.

11. An electronic apparatus, comprising:
a network interface;
memory; and
control circuitry coupled to the network interface and the memory, the memory storing instructions which, when carried out by the control circuitry, cause the control circuitry to:
identify a user apparatus for mobile device emulation detection,
collect motion sensor data from the identified user apparatus through the network interface,
perform a motion sensor data analysis operation based on the collected motion sensor data, a result of the motion sensor data analysis operation indicating whether the identified user apparatus is a physical mobile device or an emulated mobile device;
upon performance of the motion sensor data analysis operation and in response to the motion sensor data indicating no mobile device movement, provide an electronic emulation detection result indicating whether a user operating the user apparatus (i) is operating a genuine physical mobile device or (ii) is emulating the genuine physical mobile device using a device which is different from the genuine physical mobile device; and
in response to the electronic emulation detection result indicating that the user is emulating the genuine physical mobile device using the device which is different from the genuine physical mobile device, output an alert electronically indicating that the user apparatus is an emulated mobile device rather than a physical mobile device;
wherein the collected motion sensor data includes a first set of motion sensor readings and a second set of motion sensor readings;
wherein the first set of motion sensor readings includes at least one of: (i) first accelerometer data which signifies acceleration force applied to the user apparatus during the first reading collection time period, (ii) first gyroscopic data which signifies a set of rates of rotation around a set of physical axes for the user apparatus during the first reading collection time period, and (iii) first gravity data which signifies gravitational force applied to the user apparatus during the first reading collection time period; and
wherein the second set of motion sensor readings includes at least one of: (i) second accelerometer data which signifies acceleration force applied to the user apparatus during the second reading collection time period, (ii) second gyroscopic data which signifies a set of rates of rotation around a set of physical axes for the user apparatus during the second reading collection time period, and (iii) second gravity data which signifies gravitational force applied to the user apparatus during the second reading collection time period.

12. An electronic apparatus as in claim 11 wherein the control circuitry, when identifying the user apparatus for mobile device emulation detection, is constructed and arranged to:
  receive an authentication request indicating that the user operating the user apparatus wishes to authenticate.

13. An electronic apparatus as in claim 12 wherein the control circuitry, when collecting the motion sensor data, is constructed and arranged to:
  obtain the first set of motion sensor readings from the user apparatus during a first reading collection time period, and
  obtain the second set of motion sensor readings from the user apparatus during a second reading collection time period which is after the first reading collection time period.

14. An electronic apparatus as in claim 13 wherein receipt of the authentication request initiates a user authentication session to authenticate the user;
  wherein the control circuitry is constructed and arranged to obtain (i) the first set of motion sensor readings and (ii) the second set of motion sensor readings during the user authentication session to authenticate the user; and
  wherein the control circuitry, when performing the motion sensor data analysis operation, is constructed and arranged to perform a comparison operation which compares the first set of motion sensor readings to the second set of motion sensor readings to determine whether the first and second sets of motion sensor readings indicates movement of the user apparatus during the user authentication session.

15. A computer program product having a non-transitory computer readable medium which stores a set of instructions to detect mobile device emulation, the set of instructions, when carried out by computerized circuitry, causing the computerized circuitry to perform a method of:

identifying a user apparatus for mobile device emulation detection;

collecting motion sensor data from the identified user apparatus;

performing a motion sensor data analysis operation based on the collected motion sensor data, a result of the motion sensor data analysis operation indicating whether the identified user apparatus is a physical mobile device or an emulated mobile device;

upon performance of the motion sensor data analysis operation and in response to the motion sensor data indicating no mobile device movement, providing an electronic emulation detection result indicating whether a user operating the user apparatus (i) is operating a genuine physical mobile device or (ii) is emulating the genuine physical mobile device using a device which is different from the genuine physical mobile device; and in response to the electronic emulation detection result indicating that the user is emulating the genuine physical mobile device using the device which is different from the genuine physical mobile device, outputting an alert electronically indicating that the user apparatus is an emulated mobile device rather than a physical mobile device;

wherein the collected motion sensor data includes a first set of motion sensor readings and a second set of motion sensor readings;

wherein the first set of motion sensor readings includes at least one of: (i) first accelerometer data which signifies acceleration force applied to the user apparatus during the first reading collection time period, (ii) first gyroscopic data which signifies a set of rates of rotation around a set of physical axes for the user apparatus during the first reading collection time period, and (iii) first gravity data which signifies gravitational force applied to the user apparatus during the first reading collection time period; and wherein the second set of motion sensor readings includes at least one of: (i) second accelerometer data which signifies acceleration force applied to the user apparatus during the second reading collection time period, (ii) second gyroscopic data which signifies a set of rates of rotation around a set of physical axes for the user apparatus during the second reading collection time period, and (iii) second gravity data which signifies gravitational force applied to the user apparatus during the second reading collection time period.

16. A computer program product as in claim 15 wherein identifying the user apparatus for mobile device emulation detection includes:

receiving an authentication request indicating that the user operating the user apparatus wishes to authenticate.

17. A computer program product as in claim 16 wherein collecting the motion sensor data includes:

obtaining the first set of motion sensor readings from the user apparatus during a first reading collection time period, and obtaining the second set of motion sensor readings from the user apparatus during a second reading collection time period which is after the first reading collection time period.

18. A computer program product as in claim 17 wherein receipt of the authentication request initiates a user authentication session to authenticate the user;

wherein (i) obtaining the first set of motion sensor readings during the first reading collection time period and (ii) obtaining the second set of motion sensor readings during the second reading collection time period occur during the user authentication session to authenticate the user;

wherein performing the motion sensor data analysis operation includes performing a comparison operation which compares the first set of motion sensor readings to the second set of motion sensor readings to determine whether the first and second sets of motion sensor readings indicates movement of the user apparatus;

wherein obtaining the first set of motion sensor readings from the user apparatus includes acquiring: (i) first accelerometer data which signifies acceleration force applied to the user apparatus during the first reading collection time period, (ii) first gyroscopic data which signifies a set of rates of rotation around a set of physical axes for the user apparatus during the first reading collection time period, and (iii) first gravity data which signifies gravitational force applied to the user apparatus during the first reading collection time period; and wherein obtaining the second set of motion sensor readings from the user apparatus includes acquiring: (i) second accelerometer data which signifies acceleration force applied to the user apparatus during the second reading collection time period, (ii) second gyroscopic data which signifies a set of rates of rotation around a set of physical axes for the user apparatus during the second reading collection time period, and (iii) second gravity data which signifies gravitational force applied to the user apparatus during the second reading collection time period.

\* \* \* \* \*